Inventors:
Thomas L. O'Connor,
Walter Juda,
Paul H. McNally,
Norman W. Rosenberg,
Attorney

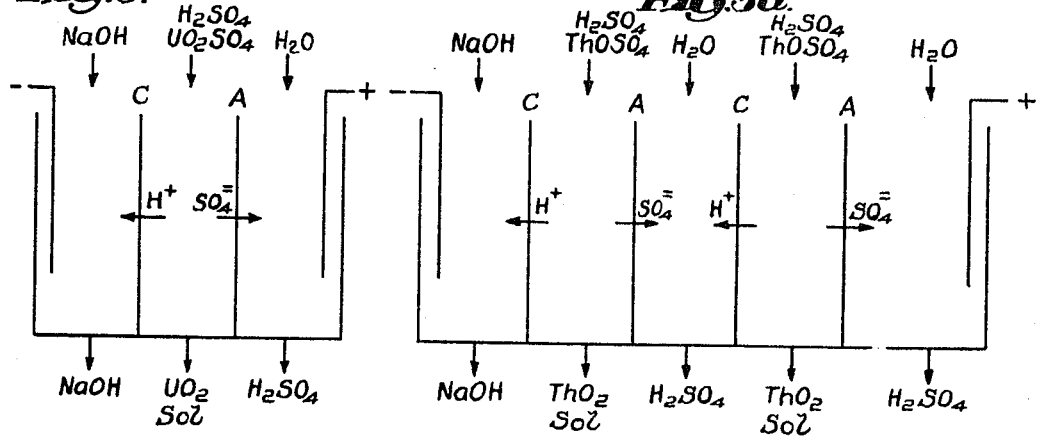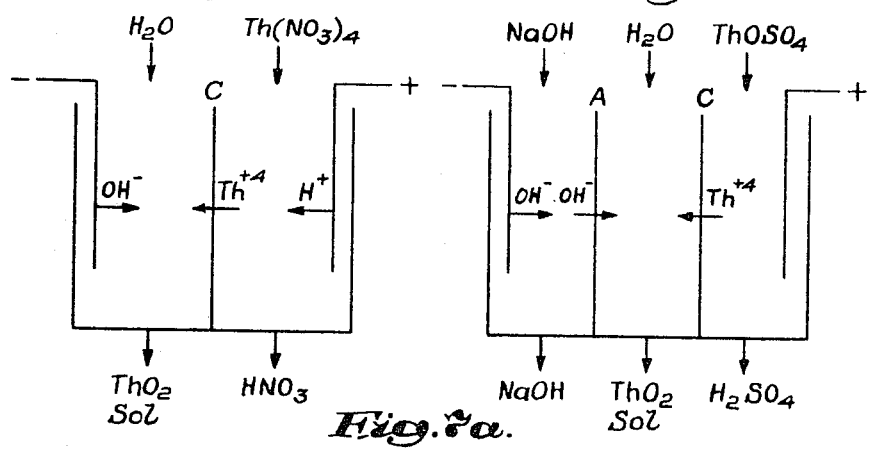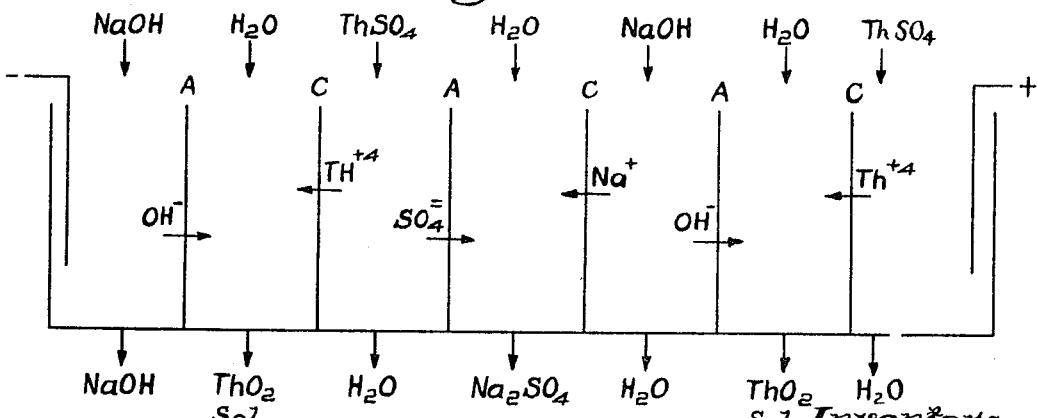

3,280,011
PREPARATION OF THORIA SOLS BY
ELECTRODIALYSIS
Thomas L. O'Connor, Dedham, Walter Juda, Lexington, Paul H. McNally, Amesbury, and Norman W. Rosenberg, Newton, Mass., assignors, by mesne assignments, to Diamond Alkali Company, Cleveland, Ohio, a corporation of Delaware
Original application June 19, 1958, Ser. No. 743,093. Divided and this application July 18, 1962, Ser. No. 216,266
1 Claim. (Cl. 204—1.5)

This application is a division of copending application Ser. No. 743,093, filed June 19, 1958, now abandoned.

This invention relates to fluid aqueous hydrated actinide oxide sols, to methods of preparation thereof, to their applications in nuclear transmutation, and to their use as fuels for homogeneous nuclear reactors. It further relates to methods of securing and sustaining nuclear reactions employing said sols, to methods of producing power by sustained nuclear reactions, and to the apparatus therefor. More particularly, it is an object of this invention to provide fluid aqueous hydrated actinide oxide sols of controlled and substantially uniform particle-size and preferably near-neutral pH, and of controlled concentration of one or more chemical compounds of the elements of the actinide group, which consists of the elements with atomic numbers of 89 and above, including among others thorium, uranium, plutonium, and combinations thereof. It is another object of this invention to provide methods of preparing such sols. Still another object of the invention is the use of such fluid-controlled aqueous sols in single-region and two-region nuclear reactors and the apparatus therefor.

Fluid, aqueous, homogenous fuels for atomic reactors, including solutions and slurries, have important economic advantages for power production over stationary solid reactor fuels. The latter are inefficient in that the solid reactor fuel must be dissolved and completely remanufactured to the purified metal after a small percentage of the fuel (generally of the order of 3% or less for power reactors) has been consumed in the reactor because of the depletion of fissionable actinide isotopes and the poisoning of fuel element by fission products. This extremely small utilization of the solid fuel element renders its use very costly for commercial power production. Typically aqueous homogeneous fuels heretofore proposed for nuclear reactors comprise solutions and/or slurries of salts of a fissionable actinide such as uranium-235 or uranium-233, with or without fertile actinide, such as thorium-232 or uranium-238. They may be used in single- or in multiple-region reactors, for example, in conjunction with a slurry blanket of fertile actinide oxide in a two-region reactor.

Homogenous reactors take advantage of the fluid state of the fuel and of the excellent moderating properties of the light or heavy water solvent. These features make it possible to obtain a fuel of high power density with low inventory; they permit a heat removal system limited only by the rate at which the fuel can be pumped and by the temperature rise; and they permit a simplified equipment design which need not be limited by the neutron-capture cross section of the cladding materials of construction or by the difficulties of extracting heat from the fuel in a solid reactor core.

The known solution or slurry reactors, whether they are of the pressurized fuel or of the boiling type, involve usually fissile material in relatively small concentration and fertile material in relatively large concentration. In the two-region reactor, the fissile material is burned (i.e., caused to undergo fission) in a core and fertile material is circulated through a blanket surrounding the core to generate more fissile material as fuel. The single-region reactor confines both these functions to a single area, the core. While, to achieve a given conversion ratio, a two-region reactor can be smaller in diameter (typically for 100–500 megawatts, core: 3′ to 6′; blanket 1.5′–3′) than the single-region reactor (6′–15′) because of the reduction of neutron leakage by the blanket, the former involves two separate heat-removal loops with pumps and associated equipment including two sets of fuel reprocessing equipment. For this reason, the single-region reactor, even though larger in diameter, is simpler to operate, therefore often preferred.

Reactors based on solution and slurry fuels have not yet found practical use because of the serious chemical and corrosion problems caused by the nature of the solution fuel and of the handling problem involved in slurries. For example, acid uranyl sulfate solutions have been investigated extensively as homogenous fuels. Hot uranyl sulfate solutions (which must be maintained at pH values below 4 to keep the uranium soluble) are very corrosive and require scarce and expensive materials of construction. Other uranium salt solutions such as nitrate, fluoride, carbonate, and phosphate have equally serious limitations. Nitrate decomposes in the reactor and neutron economy requires the substitution of nitrogen-15 for natural nitrogen, which is very expensive. Fluoride solutions undergo hydrolysis at elevated temperatures. Carbonate solutions have limited solubility at high temperatures and require also a considerable partial pressure of carbon dioxide. Uranium phosphate must be dissolved in concentrated phosphoric acid, which requires the entire reactor to be plated with a noble metal such as gold, a neutron absorber. The only thorium salt of sufficient solubility for consideration as a homogenous fuel is thorium nitrate. However, thorium nitrate undergoes decomposition at elevated operating temperatures. Many unsuccessful attempts have been made to increase the solubility of thorium salts by means of complexing agents.

Many attempts have also been made to prepare suitable uranium slurries for use as reactor fuels. Among the uranium compounds, $UO_3$, $UO_2$, $U_3O_8$, $UO_2CO_3$, $$(UO_2)_3(PO_4)_2$$

$MgUO_4$, and $MgU_2O_7$ have been considered or investigated, but proved to have serious drawbacks. A $UO_3$ slurry for example, has been prepared by calcining a $UO_3$ hydrate and adding the calcined oxide to water. When the addition is carried out below 70° C., a dihydrate is formed which is converted to the monohydrate at temperatures between 70° C. and 300° C. The monohydrate exists in two forms, one of which, the alpha modification, is rod-shaped and more adaptable to circulation in the reactor, whereas the plate-like beta modification tends to deposit very rapidly on the walls of the reactor. Attempts to avoid the alpha-to-beta conversion, which occurs at about 250° C., have been unsuccessful. Slurries of other uranium compounds have similar difficulties in that they tend to deposit on the reactor walls as well as produce erosion and settling effects.

Thorium oxide slurries have also been considered as blankets for homogenous reactors. The principal problems with thorium oxide slurries are settling, difficulties in pumping, and erosion at orifices and pump impellers. Efforts to render thorium oxide less abrasive and to stabilize the same against flocculation have been made in the past without success.

Insoluble uranium and thorium compounds suspended in slurry form, for example in heavy water, comprise particles ranging in size from 500 millimicrons to 50,000 millimicrons. The concentrations of the uranium and thorium compounds required for breeder reactors are high, namely, in excess of 10% by weight. When slurries of such high concentration and particle-size are pumped at high velocities through the reactor loops, significant abrasion and erosion of the material of construction occurs primarily by mechanical action in bends, valves, etc., due to the surface abrasion by the particles. Further, the slurries lack uniformity of particle-size and the particles tend to settle, depositing on walls and forming regions of non-uniform concentration, resulting in serious problems for reactor control, decontamination, and fuel handling. The actinide oxide slurries including thorium oxide and uranium oxide slurries just referred to, may be defined as aqueous suspensions of insoluble particles in which the average particle-size is of the order of 1000 to 10,000 millimicrons.

It is also well-known that aqueous thorium oxide sols can be formed from thorium nitrate solutions, for example, by thermal denitration or by precipitating the oxide with ammonium hydroxide, washing out soluble salts by decantation and/or electrodialysis, and peptizing the oxide in water, for example with the aid of uranyl or thorium nitrate. The dilute sols thus obtained may be concentrated by evaporation. Only limited success has been obtained using this precipitation-peptization method, because of the large particle-size of the oxide powder used as starting material and especially because the reaction of the oxide with water forms agglomerates of various hydrated oxides.

Actinide metal oxide powders of particle-size below 75 millimicrons have also been prepared by a spray technique, and have been dispersed in water by a similar method.

However, in all cases the products obtained have been unsatisfactory as reactor fuels. When solid, insoluble oxides or the like were used as the starting materials for the preparation of a sol or a slurry, the result was a thermally unstable sol in which the particle-size distribution varied widely, and/or different species or aggregates of hydrated oxides were formed. Additions of stabilizers such as a small amount of uranium, for example, to a thorium sol, did not overcome the difficulty inherent in sols made from thorium oxide powders. Indeed, even when a solid oxide powder of average particle-size below 100 millimicrons was used as the starting material, unsatisfactory sols were obtained, not merely because of the wide particle-size distribution of the solid powder, but again because of the reaction of the oxide powder with water forming agglomerates of various hydrated oxides.

The fluid aqueous hydrated actinide oxide or hydroxide sols of this invention overcome all of these drawbacks. They are suitable reactor fuels in that they fulfill the fuel requirements, which may be stated substantially as follows: The reactor fuels for single-region and two-region reactors must possess good thermal and radiation stability, they must be non-corrosive, they must remain dispersed in the reactor system and they must contain only elements (other than fissile or fertile) of low cross section to minimize parasitic absorption of neutrons.

It has now been found that substantially pH-neutral fluid aqueous sols of hydrated actinide oxides of controlled particle-size, present in concentrations suitable for use as reactor fuels, are heat and radiation stable, and non-corrosive and non-abrasive, when the average particle-diameter of the hydrated oxide is largely between 10 and 200 millimicrons. Preferably the distribution of particles should be controlled. Especially useful are sols having particles such that the diameters of at least 80% of the particles deviate no more than 30% from the average particle-diameter of the sol. Such diameters may, for example, be measured by electron microscopy techniques or their equivalent.

Sols of thorium, whose sole oxidation-state in aqueous solution is +4, called thorium (IV), are representative of all actinide sols in oxidation-state (IV), including uranium, neptunium, plutonium, americium, curium, and berkelium, either singly or in mixtures with one another or with thorium. All members of this group are known to form isomorphous compounds.

Several uses exist for neptunium, plutonium, americium, curium, and berkelium, as sols in reactors for the recovery of by-product isotopes of the same, to transform such isotopes by neutron-capture into more useful fertile and fissile materials, or to use them in high neutron-flux environments to create desirable heavier isotopes or elements of higher atomic numbers.

It is to be noted that hydrated actinide oxide sols, in concentrations required for reactor fuels, tend to gel excessively when the average particle-size is too small. Furthermore, they tend to adsorb excessive amounts of fission products. When the average particle-size is too large, the particles tend to settle from the dispersion thereby causing reactor control problems; and the dispersion becomes abrasive to container walls.

Finally, the substantially neutral sols of this invention are non-corrosive, the pH of such sol system being readily adjustable and maintainable within the range of 4–9, and preferably between 5 and 9.

Thus, the preferred sols of this invention are fluid and comprise aqueous hydrated actinide oxide particles in a critical concentration, i.e., that concentration required for self-sustaining nuclear reaction, for example equal to or exceeding those set forth in Table 1, hereinafter shown, e.g. in a 99.75% heavy water-solution ($D_2O$) and a concentration of 100 grams per liter of thorium dioxide, or a concentration of uranium-233 as trioxide above about 1.2 grams per liter, having a pH between 4 and 9, and preferably between 5 and 9, an average particle-diameter preferably between 10 and 100 millimicrons and a uniformity of particle-diameter such that at least 80% of the particles do not deviate by more than 30% from the average particle-size.

The preferred general method of preparing sols having the above characteristics comprises maintaining the hydrous actinide oxide in an aqueous system during the formation of the sol particles from an actinide compound in solution. An actinide salt or other actinide compound is dissolved in an aqueous solution with or without the addition of acids or other solubilizing compounds including complexing agents. The anion or complex cation of the actinide salt solution and the solubilizing agents, including acids and complexing agents, are hereinafter referred to as "the solubilizing ions." One preferred method of forming the fluid aqueous hydrated actinide oxide sols of this invention comprises the step of producing the hydrated actinide oxide of controlled particle-size and particle-uniformity in an aqueous system by separating the actinide and the solubilizing ions from each other in a solution of an actinide compound in heavy or light water, preferably by removing the solubilizing ions.

Typical methods of removing solubilizing ions in aqueous systems include (1) contacting the solution containing the actinide compound with granular ion-exchange resins under controlled conditions, (2) contacting the aqueous solution with ion-exchange membranes or sheets, (3) subjecting the aqueous solution to electrodialysis, for example, to electrodialysis utilizing ion-exchange membranes whereby either the actinide ions in solution or the solubilizing ions, or both, are transferred across said membranes, and (4) extracting the solubilizing ions by liquid-liquid extraction methods.

While not limited to any particular theory, it is believed that uniformity of particle-size is best obtained, in general, by controlling the conditions of removal of solubilizing ions, or by building sol particles of the preferred size from smaller ones in such a manner that dispersed seed nuclei, presumably small polymeric aggregates, are formed in the aqueous medium. The seed nuclei are believed to be expanded into larger polymeric aggregates by the addition to said seed nuclei of dispersed hydrous oxide particles smaller than the seed nuclei. The addition is preferably carried out under conditions favoring formations of hydrous monomeric molecules growing onto the seed nuclei. When seed nuclei are permitted to grow in the presence of polymeric aggregates of oxide or hydrous oxide of widely varying sizes, non-uniform sols result, requiring subsequent fractionation.

In practice, good uniformity of the final sol is preferably obtained from an appropriate dispersion of seed nuclei. A particularly advantageous method of preparing such dispersions comprises the step of removing the solubilizing ions from a solution of an actinide compound in water at a considerably faster rate than the rate of aggregation of the hydrous oxide molecules which result from the removal. As an illustration, a suitable dispersion of seed nuclei is obtained by contacting a mixed solution of uranium sulfate and thorium nitrate with a large excess of an anion-exchange resin, for example by the dropwise addition of the solution to an excess of granular or bead-form resin slurried in water under strong agitation. As an alternate illustration, the solubilizing ions may be removed by electrodialyzing the solution under high initial current densities. The rapid removal of solubilizing ions reduces the concentration of actinide ions in solution thereby decreasing the interaction between actinide hydrous oxide aggregates and actinide ions in solution which is a cause of non-uniformity. Typically, seed nuclei have average diameters greater than 0.5 millimicrons, and less than the average particle-diameter of the final sol.

Good uniformity of a final sol, preferably in the particle-size between 10 and 100 millimicrons, is obtained by growing monomeric molecules of hydrous oxides, or polymeric hydrous oxide smaller in size than the seed nuclei, herein referred to as "low polymeric particles," onto the seed nuclei. The seed and final sol-formation may be done in a single operation; or the seed-dispersion may be prepared as the first step and the final sol may be made in a separate second step, as long as the monomeric molecules or low polymeric particles are formed under conditions favoring the growth of the seed nuclei rather than monomer-monomer or monomer-low polymer interaction, preferably by preparing the monomeric hydrated oxide molecules and low polymeric particles of hydrated oxide in the presence of the larger seed nuclei.

When a given volume of solution of an actinide compound is added, in the presence of an excess of exchange resin, to a given volume of a dispersion-containing seed nuclei, the number of final sol particles is of the same order, and preferably substantially the same, as the number of seed nuclei initially present. When the average size of the final sol particles is large, then the initial concentration of seed nuclei must be small, all other things being equal.

The average particle-size is controlled, in general, by the conditions of growth of monomeric molecules and low polymeric particles onto the seed nuclei, including the size of the seed nuclei, their concentration, the concentration and rate of supply of monomeric molecules and low polymeric particles, the temperature, the agitation, and other factors.

While the general methods of preparation of suitable sols are preferred in that they permit good control of the average particle-size and of uniformity, other methods of preparing such uniform sols may be used. For example, non-uniform sols prepared by the usual precipitation-peptization method may be fractionated into uniform sols by controlled centrifugation.

Single- and two-region reactors utilizing the sols of this invention have the very important technical and economic advantages of fuel stability and lack of corrosivity. In general, the sols constituting the reactor fuel of this invention comprise fissile and fertile actinide compounds and a moderator. The preferred fissile materials include uranium-235, uranium-233 produced from thorium-232, and plutonium-239 produced from uranium-238. The preferred fertile materials are uranium-238 and thorium-232.

Homogeneous reactors of the aqueous types are characterized by their inherent self-control, since the critical concentration is assembled in a thermally expansible environment. Nuclear criticality is defined as the condition in a reactor where equal quantities of neutrons are generated in successive generations, i.e., the neutron flux is substantially constant with time. This condition can be achieved in a given reactor zone by concentration control, i.e., below a certain fissile species concentration, the critical condition cannot be reached and above a certain fissile species concentration, the critical condition will be exceeded. The self-control feature of the homogeneous reactor is the thermal expansion of the solution or suspension which will reduce the volume concentration of the fissile species, so that, if local overheating occurs, thermal expansion of the fluid fuel will automatically reduce the concentration to below criticality, causing the chain reaction to slow down and the reactor therefore "fails safe."

The single-region reactor, which has the mechanical advantages described before, requires a stable sol of adequate concentration comprising either fissile material or both fissile and fertile materials in the right proportions, a suitable moderator and no significant amounts of materials of high absorption-characteristics for neutrons. Thus, in the case of single-region reactors in which the fuel sols contain only uranium-235 or uranium-233, the fuel concentration shall be in excess of about 0.035 gram per liter. When mixed thorium-232—uranium-235 fuels are used in heavy water, as shown in Table 1, the ratio of concentrations in grams per liter of thorium to uranium is preferably below 100 to 1. When mixed uranium-238 and uranium-235 fuels are used in heavy water, as shown in Table 1, the ratio of concentration in grams per liter of uranium-238 to uranium-235 is preferably below 200 to 1.

A number of critical concentrations are listed in Table 1 for different fertile and fissile species assuming an "infinite" diameter reactor. Finite diameters will require somewhat higher critical concentrations because of neutron leakage.

TABLE I.—MINIMUM CRITICAL CONCENTRATIONS
[Actinide-oxide-water fuels for nuclear reactors]

| System | Conc. Fertile Oxide, gm./liter | Conc. Fissionable Oxide, gm./liter | Grams Fertile Isotope per Gram Fissionable Isotope | Percent E [1] |
|---|---|---|---|---|
| $U^{233}O_3$ | 0 | 0.035 | 0 | 100 |
| $Th^{232}O_2$ | 10 | 0.13 | 79 | 1.25 |
| $D_2O$ (99.75%) | 97 | 1.15 | 89 | 1.1 |
|  | 240 | 3.3 | 76 | 1.3 |
|  | 460 | 8.6 | 56 | 1.74 |
|  | 860 | 33.4 | 27 | 3.52 |
| $U^{233}O_3$ | 0 | 0.046 | 0 | 100 |
| $Th^{232}O_2$ | 10 | 0.57 | 18 | 5.2 |
| 95% $D_2O$ | 98 | 1.6 | 65 | 1.5 |
|  | 240 | 3.6 | 70 | 1.4 |
|  | 450 | 7.7 | 62 | 1.6 |
|  | 890 | 23 | 40 | 2.4 |
| $U^{233}O_3$ | 0 | 8.83 | 0 | 100 |
| $Th^{232}O_2$ | 10 | 9 | 1.15 | 46 |
| $H_2O$ | 97 | 10 | 10 | 9 |
|  | 240 | 12 | 22 | 4.4 |
|  | 460 | 14 | 34 | 2.8 |
|  | 900 | 20 | 47 | 2.1 |
| $U^{235}O_3$ | 0 | 0.040 | 0 | 100 |
| $Th^{232}O_2$ | 10 | 0.15 | 70 | 1.40 |
| $D_2O$ | 98 | 1.1 | 93 | 1.06 |
|  | 240 | 4.0 | 64 | 1.54 |
|  | 470 | 11 | 46 | 2.1 |
|  | 900 | 54 | 18 | 5.4 |
| $U^{235}O_3$ | 0 | 10 | 0 | 100 |
| $Th^{232}O_2$ | 10 | 10 | 1 | 49 |
| $H_2O$ | 97 | 11 | 9 | 10 |
|  | 240 | 13 | 19 | 5.0 |
|  | 460 | 16 | 30 | 3.2 |
|  | 900 | 23 | 41 | 2.4 |
| $U^{235}O_3$ | 0 | 0.040 | 0 | 100 |
| $U^{238}O_3$ | 11 | 0.089 | 120 | 0.82 |
| $D_2O$ | 105 | 0.63 | 170 | 0.60 |
|  | 260 | 1.1 | 135 | 0.74 |
|  | 500 | 5.2 | 95 | 1.04 |
|  | 930 | 25 | 37 | 2.64 |
| $U^{235}O_3$ | 0 | 10 | 0 | 100 |
| $U^{238}O_3$ | 11 | 10 | 1.0 | 49 |
| $H_2O$ | 100 | 11 | 9.6 | 9.5 |
|  | 260 | 12 | 22 | 4.4 |
|  | 500 | 13 | 37 | 2.6 |
|  | 920 | 16 | 57 | 1.7 |
| $Pu^{239}O_2$ | 0 | 0.017 | 0 | 100 |
| $U^{238}O_3$ | 11 | 0.04 | 250 | 0.39 |
| $D_2O$ | 110 | 0.29 | 340 | 0.30 |
|  | 260 | 0.90 | 260 | 0.38 |
|  | 500 | 2.7 | 170 | 0.59 |
|  | 930 | 30 | 29 | 3.3 |
| $Pu^{239}O_2$ | 0 | 4.5 | 0 | 100 |
| $U^{238}O_3$ | 10 | 4.5 | 2.2 | 32 |
| $H_2O$ | 100 | 5.0 | 20 | 4.8 |
|  | 260 | 55 | 44 | 2.2 |
|  | 500 | 6.3 | 74 | 1.33 |
|  | 920 | 7.7 | 110 | 0.88 |

[1] $E = \frac{\text{gms. fissionable isotope}}{\text{gms. (fissionable and fertile) isotopes}}$ Practical concentrations of thorium or uranium-238 in mixed fuels are between 50 grams per liter and 1500 grams per liter, and preferably between 100 grams per liter and 600 grams per liter.

Preferred single-region sols of this invention are fluid aqueous sols having a pH between 4 and 9, and preferably between 5 and 9, which comprise hydrated thorium oxide sol particles of an average size of 35 millimicrons and of a uniformity such that at least 80% of the thorium oxide particles deviate no more than 30% from the average particle-size, the thorium oxide particles being present in amounts between 50 and 1500 grams per liter, and comprising also hydrated uranium oxide either incorporated in the thorium sol particles or as separate particles having similar average size and uniformity. These particular sols have the advantage of stabilization of the thorium and uranium particles, that is, the presence of thorium stabilizes the hydrous uranium oxide particles.

When mixed plutonium-uranium fuels are used the plutonium concentration should exceed 0.3 gram per liter and the uranium-238 concentration should be between 50 grams per liter and 1000 grams per liter.

Typically, a two-region reactor requires uranium-235 or uranium-233 in concentration exceeding about 0.035 gram per liter in the core and thorium between 50 and 1500 grams per liter in the blanket.

Light or heavy water can be employed as nuclear moderators for the sol fuels.

The processes of this invention utilizing ion-exchange resins in granular or bead form, to remove solubilizing ions from the actinide solution onto the resin, may be controlled by the choice of the following:

(1) The "active" exchange resin; strongly or weakly ionized; acidic or basic
(2) The temperature
(3) The nature, concentration, and pH of the solution containing the actinide compound (in heavy or light water)
(4) The relative amounts of active resin and solution
(5) The rate of contacting resin and solution
(6) Agitation.

In general, solubilizing cations or anions, respectively, are removed from the solution of the actinide compound onto a cation or anion exchange resin, respectively, in exchange for either hydrogen or hydroxyl ions. Upon partial or complete exhaustion of the resin, it may be regenerated separately by the usual acid or base regeneration.

Suitable ion-exchange resins include—

A. Strongly ionized exchangers such as:

*Either* (i) Sulfonic acid (or other strongly acid) exchangers, for example, sulfonated polystyrene-divinyl benzene copolymers (sold commercially as Dowex 50, Amberlite IR 120, etc.), sulfonated phenol-formaldehyde resins (Dowex 30), sulfonated coal or the like.

*Or* (ii) Quaternary ammonium (or other strongly basic) exchangers, for example, polystyrene-divinyl benzene copolymers containing quaternary ammonium groups introduced by chloromethylating the copolymer and treating it with a tertiary amine (Dowex 1, Dowex 2) or a vinyl pyridine divinyl benzene copolymer treated with methylsulfate or the like.

B. Weakly ionized exchangers such as:

*Either* (iii) Carboxylic acid (or other weakly acid, including phosphonic) exchangers, for example, copolymers of methacrylic acid and divinyl benzene (Amberlite IRC-30) or the like.

*Or* (iv) Primary, secondary or tertiary amine (or other weakly basic) exchangers including polystyrene-divinyl benzene copolymers containing secondry or tertiary amine groups introduced by chloromethylating the copolymer and then treating it with a primary or secondary amine (Amberlite IR 45, Dowex 3) or a phenol-polyalkylene poly amine formaldehyde condenstion product or the like.

The weakly ionized exchangers are particularly advantageous because the change in pH at the resin solution interface, due to exchange of ions with the solution layer around the resin particle, is considerably less drastic than that of the strongly ionized exchangers.

The choice of temperature is another important factor in the preparation of stable sols. Temperature influences the rate of monomer formation and the rate of aggregation. In addition, the chemical nature of the hydrous actinide oxide often depends upon the operating temperature. For example, when uranium containing sols are prepared, a sol made above 70° C. will contain the monohydrate which is also the stable form at reactor temperatures. In reactor practice, care should be taken to maintain uranium monohydrate sols above this temperature to avoid reversion of the monohydrate to the dihydrate.

The temperature of sol preparation in accordance with this invention may vary widely depending upon the conditions of preparation used. It has, however, been found that temperatures between 50° C. and 150° C. are preferable, a temperature of about 100° C. being often most convenient and desirable. Processes operating at room temperature are also feasible in some cases. When ion-exchangers are used in the process of this invention, strongly ionized exchangers operate with good efficiency at temperatures between 60° C. and 80° C., whereas most weakly ionized exchangers are significantly more effective when the process is carried out at a temperature of at least 90° C.

When a cation exchanger is contacted with a solution of an actinide compound, the cations of the solutions, such as an alkali metal ion, will be exchanged for hydrogen ions of the resins. For example, $UO_3$ can be dissolved in an excess of $Na_2CO_3$ to yield the soluble complex $Na_2(UO_2(CO_3)_2) \cdot H_2O$ which, when used as a feed solution in one of the processes of this invention, will lose the sodium to the exchange resin and the $CO_2$ to the atmosphere either by means of the heat applied during the exchange process or by subsequent heating if the temperature during the exchange was relatively low, and be therefore transformed into a hydrous uranium oxide sol. Soluble thorium compounds in a form suitable for a cation exchanger are $Na_2(Th(CO_3)_3) \cdot 12H_2O$, $(HN_4)_2(Th(CO_3)_3) \cdot 6H_2O$ and $(NH_4)_4(Th(C_2O_4)_4) \cdot 4H_2O$.

Somewhat more preferable is the use of anion exchangers in the exchange process of this invention for the exchange mechanism in these cases is simpler due to the absence of the necessity for eliminating $CO_2$, and freedom from precipitating the actinide metal as a carbonate, oxalate, or an alkali actinate. Solutions suitable for anion exchangers would include $UO_2Cl_2$ and $Th(NO_3)_4$. The products obtained, as in the cation exchanger process, are hydrated actinide oxide sols.

The feed solution may contain dissolved salts or complexes of any of the actinide metals occurring either singularly or in a desired ratio. The processes of this invention are adaptable to the utilization of a feed solution containing any number of actinide metals as salts or complexes occurring in any desired ratio and in any concentration up to the limits of solubility for the particular compounds and to the production of sols containing any number of actinide metals as the hydrated oxides occurring in any desired ratio and in any concentration up to the limits of stability which is about 600 grams per liter. A preferred reactor fuel of this invention is a mixed sol or uranium and thorium with a Th/U ratio, by weight, of between 50/1 and 100/1, with an average particle-size between 10 millimicrons and 200 millimicrons.

In the processes of forming the sols of this invention consisting of contacting a solution of an actinide oxide with an excess of a granular ion-exchange resin, the procedures can be described as follows. (1) The solution is added at a constant and predetermined rate to a slurry of the ion-exchange resin and water at a temperature between 50° C. and 150° C., but preferably at about 100° C., and starting at the pH of the particular resin used. (2) The solution and the ion-exchange resin are added simultaneously to a mixing zone at a temperature between 50° C. and 150° C. (3) The resin is added to an agitated solution of the actinide compound at a temperature between 50° C. and 150° C. (4) The ion-exchange resin and the solution are agitated vigorously for more than 60 minutes at room temperature.

The first procedure is preferred since it is adaptable toward the production of sols having a controlled average particle-diameter between 10 millimicrons and 200 millimicrons. Particle-size can be predetermined by plotting addition rates versus particle-sizes obtained and thereafter adjusting the rate of addition of the actinide metal solution to produce the sol with the particular average particle-size desired, said sol produced being distinguished by its uniformity of particle-sizes which ordinarily is in the order of 80% of the particles having a standard deviation below 30%. An advantage of this procedure is the fact that the rate of addition is a variable governing the growth of the sol particles and the pH is not controlled at any time. The rate of addition of the solution must be slow enough so that self-nucleation of newly formed sol particles is not a continuous phenomenon, but confined only to the first few seconds of the addition. The rate of addition is ordinarily less than 3% per minute of the total amount of actinide required for the sol.

More specifically, it is preferred that this procedure be carried out with a weak exchanger of high capacity at 100° C. for the exchange mechanism, particularly pH changes, of weak exchangers can be more closely controlled for the exchange is sufficiently rapid, enabling the process to be completed in a reasonably short period of time and furthermore permits the simultaneous evaporation of water from the mixing zone thus aiding in the concentrating of the resulting sol. In this respect evaporation is often allowed to continue after the addition of the actinide metal compounds has been completed in order to achieve optimum high concentrations of the actinide sol. In addition, this high temperature is also an important factor in the elimination of $CO_2$ from the mixing zone where a cation exchanger is being employed and a feed of the actinide metal as a soluble carbonate complex is used.

It is not necessary to stop at any particular pH, however, the final pH being determined by the nature of the resin, by the solutions used, and by final adjustment. For example, using a weakly anionic exchanger resin such as Amberlite IR-45, the initial pH will be approximately 8 and will gradually decrease to a final pH of about 1. It may then be raised above 4 by contacting the solutions with a basic resin. Similarly, for a weakly cationic exchange resin, such as Amberlite IRC-50, the initial pH will be about 3.5 and increase to about 8.

Furthermore, in this procedure, a small amount of a stable sol of seed nuclei can be added initially to the resin-water mixture furnishing the initial nuclei necessary for growth of the relatively large particles. The seed can be in the form of a sol of one or more of the actinide metal oxides or it can be a silica sol, and ordinarily constitutes less than 20% of the total amount of actinide metal to be added and preferably less than 5%. In essence, a solution of a soluble actinide metal compound is added to a mixture of an actinide oxide sol and an ion exchange material until at least five times as much actinide oxide sol has been formed as was originally present. An equation applicable to the determination of particle-sizes using a seed is $$R_1^3 = \frac{W_1}{W_2} \cdot R_2^3$$

where $R_1$=final particle-size, $R_2$=particle-size of sol used as seed, $W_1$=final weight of the actinide metal in the sol, and $W_2$=weight of actinide metal in the seed sol.

More complicated procedures of contacting the actinide metal solution with the ion-exchange resin include adding the two simultaneously to a mixing zone and adding the resin to an agitated aqueous solution of the actinide metal. In these cases, the temperature used should be as high as is practical.

Another procedure for contacting the actinide metal solution with anion exchanger involves the agitation of the two components at room temperature, i.e., between 10° C. and 30° C., for a period of time generally not less than one hour. The ion-exchanger for this procedure should be a weak exchanger; the initial pH can be the pH of the resin employed.

The products obtained from the procedures in which the particle growth are closely controlled are characterized by a high degree of uniformity of sizes of particles and are stable at temperatures up to 300° C. for long periods of time.

To enhance the stability of the actinide sols of the present invention, a relatively small quantity of silica may be introduced into the above prepared actinide sols.

Besides silica, other oxides, such as zirconium and aluminum oxides, are particularly effective because of their higher insolubility accompanied by a low nuclear cross section. Useful, but less preferred, are iron, chromium, vanadium, and nickel oxides for this purpose. For example, high temperature stability of an actinide metal sol may be enhanced by growing onto the sol particles, to form a sheath, a layer of metal oxide of low solubility by adding an acid solution of $ZrOCl_2$, very slowly to prevent self-nucleation, to a freshly prepared $ThO_2$ sol in the presence of excess anion exchange resin in the hydroxyl form.

In the present disclosure, thermally stable is understood to mean that at temperatures of about 250° C. to 375° C., the temperatures usually attained in a nuclear reactor, no macroscopic segregation of the sols into regions of different compositions would result for at least one hour.

The invention will be best understood by reference to the drawings of representative procedural embodiments thereof in which:

FIGURES 2 to 7(a) are various flow sheet arrangements of cells wherein the solubilizing ions of the actinide metal solutions are removed by electrodialysis employing ion selective membranes therein.

In many instances it will be clear to those skilled in the art that non-selective membranes may be used in place of some or all of the shown ion selective membranes.

Figure 1:
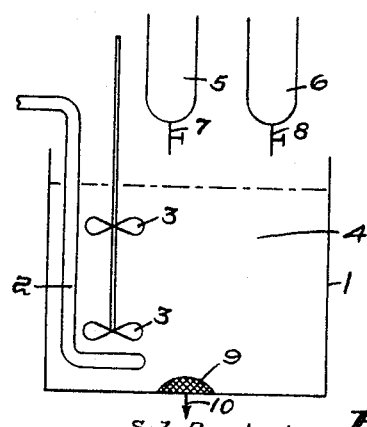
FIGURE 1 is a simple arrangement for producing the sols where the solubilizing ions are removed by ion exchange material in granular form.

Referring particularly to FIGURE 1, a container 1 contains the ion exchange granular material in slurry form 4 by means of stirrer 3. A heating element 2 is immersed in the slurry for effecting the elevated temperatures of the reaction. The actinide metal salt solution is added from container 5 at a controlled rate by means of valve 7. Another container 6 is employed for adding controlled amounts of seed solution or coating material to container 1 through valve 8. After the reaction is completed, the sol is drawn off at 10 through screen 9, the latter retaining the spent ion exchange material.

FIGURES 3 to 7(a), which include anion selective membranes A and/or cation selective membranes C, are self-explanatory, and the procedure for making the sols is apparent therefrom. It will be noted that various adjacent combinations of selective membranes may be employed with the necessary reacting solutions passed through the respective chambers, thus producing the actinide metal sol as an effluent. Suitable anion and cation permeable membranes and the method of making the same are described in the following patents:

Walter Juda et al., Patent No. 2,636,851; J. T. Clarke, Patent No. 2,732,350; J. T. Clarke, Patent No. 2,730,768; J. T. Clarke, Patent No. 2,800,445.

One preferred anion permeable membrane is prepared as follows:

| | Parts by volume |
|---|---|
| 2 vinyl pyridine (containing 0.1 percent hydroquinone) | 108 |
| Isopropanol | 120 |
| Dimethyl sulfate | 108 |
| Divinyl benzene (76 mol percent in ethyl vinyl benzene) | 81 |

The 2 vinyl pyridine was dissolved in the isopropanol and warmed to 55° C. The dimethyl sulfate was then added at a rate such that the temperature did not exceed 65° C. The mixture was cooled to room temperature and the divinyl benzene was added. The resulting liquid was then cast to form a film 150 inches long, 6 inches wide and 0.05 cm. thick on a reinforcing of glass cloth between parallel smooth casting surfaces, and heated to 80° C. for three hours while retained between the surfaces. After the membrane had cooled to room temperature, it was leached in methanol, washed with water and finally equilibrated first in 1.0 N sodium chloride and then in 0.1 N sodium chloride.

A preferred cation permeable membrane is prepared as follows:

| | Parts by weight |
|---|---|
| Resorcinol | 55 |
| Phenol | 47 |
| Sulfuric acid (96%) | 103 |
| Formaldehyde (37% in water) | 131 |
| Water | 33 |

The resorcinol and phenol were melted together at a temperature of 100° C. and then cooled to 60° C. and the sulfuric acid was added. The temperature was raised to 105° C. by this addition. The sulfonated mixture was allowed to cool to 50° C. and the water was then added. The formaldehyde was cooled to −10° C. and the sulfonated mixture was added to it slowly with stirring over a period of 30 minutes while maintaining the temperature between 0 and −5° C. The liquid was cast on a reinforcing of treated cellulose battery paper between two parallel smooth casting surfaces to form a film 0.05 cm. thick, and cured for 3 hours at 80–85° C. After the membrane cooled, it was leached repeatedly in distilled water and equilibrated in a 0.1 sodium chloride solution.

The following examples represent illustrations of the invention generally set forth above, but not in limitation of the scope of the invention.

*Example 1*

A solution I is made by dissolving 200 gm. $UO_2Cl_2$ and 10 gm. HCl in 1 liter of water. A solution II is made by dissolving 200 gm. $Th(NO_3)_4$ and 10 gm. $HNO_3$ in 1 liter of water. A one-liter portion of weakly basic anion exchange resin (Amberlite IR–45) in the hydroxyl form is agitated in a stainless steel beaker at 100° C. with half its volume of water. A 10 ml. portion of solution I and 100 ml. portion of solution II are mixed and then added at a 10 ml./minute rate to the reactor, containing one liter of resin. At the conclusion of the addition, the mass is continued in agitation for a period of one hour, and then the supernatant sol is decanted from the reactor. Water is evaporated from the decanted sol at 100° C. until a thorium oxide concentration of 200 grams per liter is achieved, at which point a 20 g.p.l. concentration $UO_3$ and a pH of 5.5 is also achieved in the sol. After centrifugation for 10 minutes at 500 gravities force to remove colloidal resin and other impurities, a particle-size analysis is made by taking an electron microscope picture of the sol. From measurements of the electron microphotograph, a particle-size distribution is determined.

In both cases the particle-diameter distribution is in the form of a Gaussian distribution, with a 13 millimicron average diameter and with more than 80% of the particles within the range 9–17 millimicrons, i.e., within 30% of the average value.

The sol is stabilized to heat by autoclaving the sol for periods of 10 to 50 hours at a temperature between 200° C and 300° C. The resulting thickened sol is then adjusted to the desired viscosity by addition of water.

It will be apparent that the anion exchange resin above could be in the carbonate form as an equivalent to the hydroxyl form.

*Example 2*

The details of Example 1 are followed, except that the rate of addition is reduced fourfold, to 2.5 ml. per minute. The electron microscopy shows an average particle-size of 25 millimicrons with over 80% of the particles in the range 18–30 millimicrons.

Thus, the slower rate of addition is effective in increasing, in a controlled manner, the average particle-size of the sol.

As a second preferred method, a solution of actinide salts is added to an excess of a solution of a liquid ion-exchanger, such as a water-insoluble, solvent-soluble amine, in kerosene.

The sol is stabilized to heat by autoclaving the sol for periods of 10 to 50 hours at a temperature between 200° C. and 300° C. The resulting thickened sol is then adjusted to the desired viscosity by addition of water.

Example 3

A solution is made by dissolving 10 gms. $UO_2(NO_3)_2$ and 100 gms. $Th(NO_3)_4$ and 10 gms. $HNO_3$ in 1 liter of water. This solution is slowly added to an agitated reactor containing one kg. of tri-iso-octyl amine in 10 kg. of kerosene, over a period of three hours, at a temperature of 90° C. The aqueous sol is drawn off from the organic layer, and is subjected to particle-size analysis similar to that of Example 1. An average particle-size of 35 millimicrons is obtained, with 85% of the particles having diameters between 25 and 45 millimicrons. The pH of the sol is found to be 6.2.

Example 4

A solution 15% in uranium is made by dissolving $UO_3$ in an excess of $Na_2CO_3$. 1000 ml. of this solution is added to a boiling mixture of 850 ml. of a weakly acidic cation exchange resin Amberlite IRC–50 in the hydrogen form and 500 ml. water at a constant flow rate of 8 ml./minute with vigorous agitation and the boiling is allowed to continue for 100 minutes after the completion of the addition. The supernatant sol is decanted and analyzed to a $UO_3$ concentration of 120 g.p.l. with a pH of 5.0. The sol is autoclaved at 250° C. for 16 hours in a sealed glass tube. The average particle-size is found to be 28 millimicrons in measurements both before and after the autoclaving. In both cases 90% of the particles are within the range 21–35 millimicrons.

It will be apparent that the cation exchange resin above could be in the ammonium form as an equivalent to the hydrogen form.

Example 5

10 ml. of the sol obtained in Example 1 is added to a boiling mixture of 2000 ml. of Amberlite IR–45 resin and 1000 cc. water instantaneously. Then, at a constant rate of 2 ml./minute, 220 cc. of a solution made by mixing 200 ml of solution II with 20 cc of solution I is added with vigorous agitation and the boiling allowed to continue for 60 minutes after the completion of the addition. After the separation and analysis, the mixed sol has a thorium concentration of 320 g.p.l. and a uranium content of 32 g.p.l. with a pH of 5.7. The average particle-size is 44 millimicrons with 80% of the particles in the range 32–56 millimicrons.

The sol is stabilized to heat by autoclaving the sol for periods of 10 to 50 hours at a temperature between 200° C. and 300° C. The resulting thickened sol is then adjusted to the desired viscosity by addition of water.

Example 6

A solution 10% in thorium is made by dissolving thorium hydroxide in an excess of ammonium carbonate, 500 ml. of this solution is placed in a polyethylene bottle and vigorously stirred while 450 ml. of Amberlite IRC–120 resin is added over a period of 4 minutes. Then the bottle is capped and agitated by a mechanical shaker for 16 hours. The solution is filtered through Orlon cloth and evaporated at 80° C. to a final thorium concentration of 205 g.p.l. with an average particle-size of 10 millimicrons with 90% of the particles within the range 8–12 millimicrons.

The sol is stabilized to heat by autoclaving the sol for periods of 10 to 50 hours at a temperature between 200° C. and 300° C. The resulting thickened sol is then adjusted to the desired viscosity by addition of water.

Example 7

A solution containing (per liter) 1 gm. of $UO_2SO_4$, and 100 gm. of $Th(SO_4)_2$, and 5 gm. of $H_2SO_4$ is subjected to a direct electric current in the cathode compartment of an electrodialysis cell, consisting of a cathode chamber and an anode chamber separated by an anion selective membrane, at a current density of 100 amps per ft.$^2$. After five hours of recirculating electrolysis at 85° C. and a voltage of about 5 volts D.C., the pH increases to 6.2, and a sol may be withdrawn from the compartment. Particle-size analysis, similar to that of Example 1, indicates a 55 millimicrons particle-size with at least 80% of the particles having diameters between 40 and 70 millimicrons.

A number of electrolytic cell arrangements can provide useful control of rate of particle-size growth. Some of these are represented by FIGURES 2 to 7(a), and some representative examples thereof are as follows:

Example 8

Figure 2:
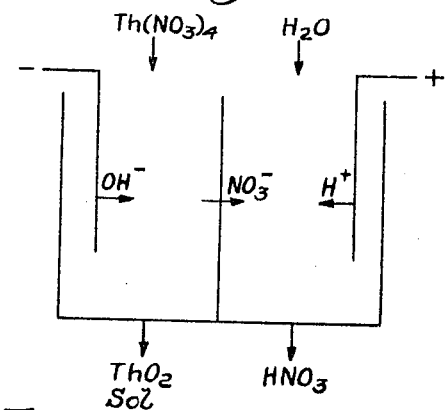

In the cell of FIGURE 2 thorium nitrate is fed to a cathode chamber, separated from an anode chamber by an anion selective membrane. Under current, solubilizing anions are transferred from the cathode chamber, and hydrogen ions are released as hydrogen gas at the cathode. As the acidity decreases, the actinide metal oxide solubility is exceeded, and growth of actinide metal oxide sol particles commences, either by self-nucleation or onto seed nuclei added to the chamber. The rate of precipitation and hence the rate of particle growth is controlled by the current imposed on the cell. In the specific example, a solution containing 100 g.p.l. $ThNO_3$, 10 g.p.l. HCl, and 10 g.p.l. $NO_2Cl_2$ is recirculated through the cathode chamber, while a current of 1 ampere per square foot of membrane surface is passed. Over a period of five hours, a volume of about 1 liter of sol is prepared in a cell containing ten square feet of membrane area.

The sol is stabilized to heat by autoclaving the sol for periods of 10 to 50 hours at a temperature between 200° C. and 300° C. The resulting thickened sol is then adjusted to the desired viscosity by addition of water.

Example 9

Figure 3:
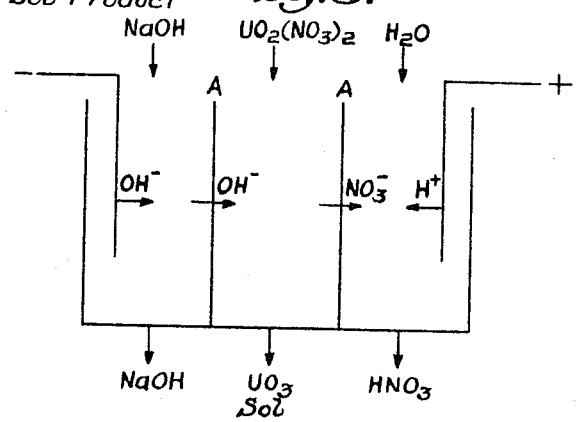

The cell of FIGURE 3 is a modification of that of FIGURE 2, wherein two anion membranes define three compartments. In this cell the actinide metal solution is not exposed to the gas-generating electrode surface, and contamination by the electrode material is thereby avoided. In this cell, a current of five amperes over a period of ten hours is required to prepare 1 liter of sol from a starting solution similar to that of Example 8.

Example 10

Figure 4:
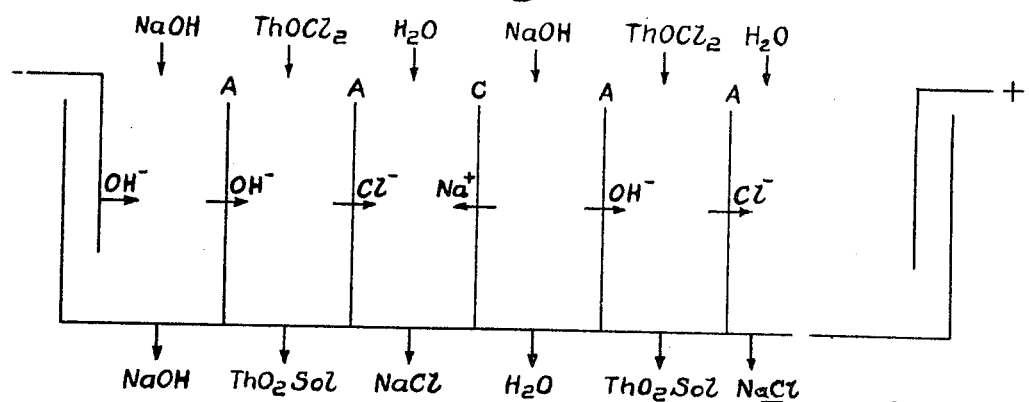

A multiple membrane cell shown as FIGURE 4 operates on a similar principle to that of Example 9, but allows a single pair of electrodes to suffice for a large number of preparative cells. Hydroxide ion, transferred into the chamber from a sodium hydroxide feed solution rather than electrolytic current, provides for the neutralization of hydrogen ion and formation of metal oxide sol. In this cell, the repetitive unit consists of three membranes defining three chambers, and a group of 100 such units (300 chambers), each containing ten square feet of membrane area defining each chamber, produces 100 liters of sol over five hours of one ampere per square foot current density.

The sol is stabilized to heat by autoclaving the sol for periods of 10 to 50 hours at a temperature between 200° C. and 300° C. The resulting thickened sol is then adjusted to the desired viscosity by addition of water.

Example 11

The radically higher mobility of the hydrogen ion, as compared with the actinide metal ions, makes possible the use of a single demineralization type cell of FIGURE 5 or a multiple demineralization cell of FIGURE 5a. These cells do not require the consumption of caustic and have lower current efficiencies, so that about twice the current density is required as in Examples 8 to 10.

The sol is stabilized to heat by autoclaving the sol for periods of 10 to 50 hours at a temperature between 200° C. and 300° C. The resulting thickened sol is then adjusted to the desired viscosity by addition of water.

*Example 12*

As shown in FIGURES 6, 7 and 7(a), thorium ion can be introduced through a cation membrane at a controlled rate into a hydroxide-containing chamber to produce the desired sol. The hydroxide can be provided by electrolysis in the cell, FIGURES 6 and 7, or by transfer from NaOH solutions fed in a multiple membrane unit of FIGURE 7(a).

*Example 13*

As an example of enhancing the thermal stability of the sols as produced by the examples above, one liter of the thorium sol of Example 7 is used to suspend 500 g. of the weak anion resin Amberlite IRC-30 at a pH of 6 and at a temperature of 100° C. 10 ml. of a 1 molar solution of $ZrO(NO_3)_2$ is then added thereto over a period of two hours causing a precipitate of zirconium oxide to grow upon particles of the thorium oxide in the sol. The produced zirconium oxide coated thorium oxide sol is found to be particularly stable at 270° C. for periods of at least ten days.

We claim:

A method for the preparation of a thorium oxide sol which is thermally stable at temperatures up to about 375° C., which method comprises passing an aqueous solution of a thorium metal salt through a first chamber bounded on at least one side by a cation permeable membrane, passing water through a second chamber on the opposite side of said membrane, and applying an electric current across said membrane and solutions at room temperature, thereby causing the thorium ions in said thorium salt solution to pass through said membrane into said second chamber and form said thorium oxide sol in said second chamber.

References Cited by the Examiner

UNITED STATES PATENTS 2,832,728   4/1958   Kumin _____ 204—1.5
3,097,175   7/1963   Barrett et al. _____ 176—87

OTHER REFERENCES

AEC Document HW-56096, May 26, 1958, pp. 38-41 and 44-46.

AEC Document ORNL-1812, Jan. 27, 1955, pages 8-13.

REUBEN EPSTEIN, *Primary Examiner.*

CARL D. QUARFORTH, *Examiner.*

J. D. VOIGHT, *Assistant Examiner.*